Nov. 30, 1965  C. L. FICKER  3,220,602

CONTAINER AND METHOD OF MAKING IT

Filed Sept. 21, 1961

INVENTOR.
CHARLES L. FICKER
BY Donald G. Dalton
ATTORNEY

United States Patent Office 3,220,602
Patented Nov. 30, 1965

3,220,602
CONTAINER AND METHOD OF MAKING IT
Charles L. Ficker, Greenwich, Conn., assignor to United States Steel Corporation, a corporation of New Jersey
Filed Sept. 21, 1961, Ser. No. 139,774
2 Claims. (Cl. 220—63)

This invention relates to an improved metal container and to a method of making the same.

Although my invention has broader application, its principles are particularly applicable to a metal drum which has a body of plain carbon steel and a liner of corrosion-resistant metal, such as stainless steel. Drums of this construction commonly are used for food and otherwise where resistance to corrosion is required, since drums of stainless steel or the like throughout are unduly costly. Previously such drums have been made entirely of laminated stock, or the cylindrical wall has been made by inserting a preformed liner shell into a preformed body shell and only the end walls made of laminated stock. Either method as practiced heretofore has disadvantages. Welding a longitudinal seam is extremely difficult in laminated stock and usually is unsatisfactory since the metal of the outer shell tends to mix with the metal of the liner. Excluding air and preventing leakage between preformed shells likewise has been difficult.

An object of the present invention is to provide an improved lined container and method of making the same wherein I overcome difficulties previously encountered.

A more specific object is to provide an improved lined metal container and method of making the same in which I insert a liner shell within a body shell and expand both shells uniformly in a way to assure a leakproof bond in the resulting composite shell.

Figure 1:
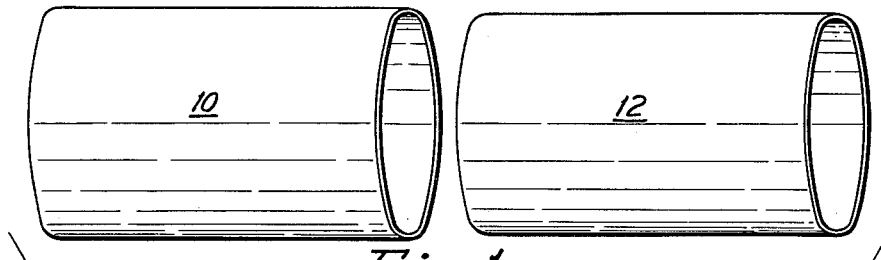
FIGURE 1 is a diagrammatic exploded perspective view not to scale of a body shell and a liner shell prior to assembling.

FIGURE 1 shows an outer body shell 10 and an inner liner shell 12 of approximately the same length. Both shells are preformed to cylindrical shape and welded along their lengthwise seams. The outer shell commonly is of plain carbon steel and the inner shell of stainless steel, although my invention is not limited to any particular combination of materials. If the body shell is to be clad externally instead of lined, the material of the shells can be reversed. The inner shell is of a diameter to be inserted freely into the outer shell, yet closely received therein.

Figure 2:
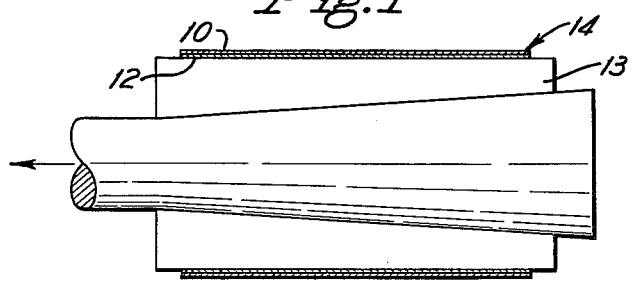
FIGURE 2 is a diagrammatic longitudinal sectional view not to scale of the assembled shells with an expanding mandrel inside.

As shown in FIGURE 2, I insert the inner shell 12 within the outer shell 10 so that their ends are approximately even. If desired, I can secure the two shells together with a layer of adhesive at their ends or throughout. Next I place the shells, which are moving in a line, over a conventional expanding mandrel 13 (shown only diagrammatically). I expand the inner shell uniformly into tight engagement with the outer shell and continue expanding the shells until the outer shell also expands measurably and uniformly. Typically the inner shell may have an original inside diameter about ¼ inch smaller than the inside diameter of the outer shell. After expanding, the resulting composite shell 14 has an inside diameter at least ½ inch larger than originally. Thus I have also expanded the outer shell sufficiently to increase its diameter at least ¼ inch. This expansion assures a tight uniform fit between the two shells, and leaves no air space or crevice where leakage can occur, thus forming a tight unitized body, for all practical purposes of one piece.

Figure 3:
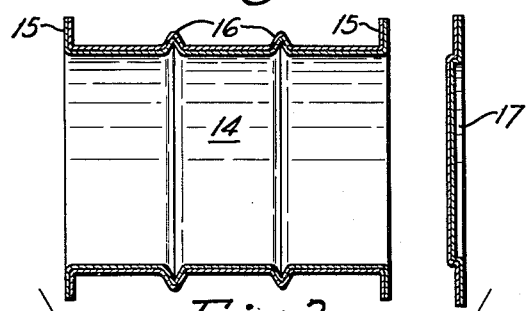
FIGURE 3 is a diagrammatic exploded sectional view not to scale of my composite shell and one end wall prior to assembling.
Figure 4:
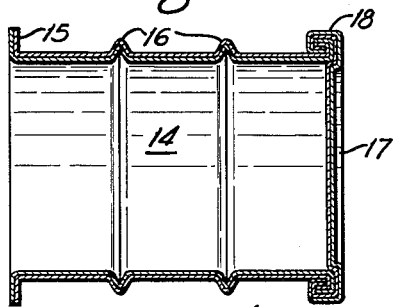
FIGURE 4 is a diagrammatic longitudinal section not to scale of my container with the shell and one end wall assembled.

As shown in FIGURE 3, I next bend the end edges of the composite shell outwardly as indicated at 15, and form intermediate beads or rolling hoops 16 using conventional equipment (not shown). I have illustrated the bent edges as flanged, but it is obvious they can be formed in other ways. For example one end can be formed with a conventional curl to receive a removable cover. I install one or both end walls 17, only one of which is shown. This end wall is blanked and drawn of laminated stock, the outer and inner thickness of which normally are similar in composition to the respective outer and inner shells 10 and 12. As shown in FIGURE 4, I attach the end wall with the usual double seam 18 which I form with conventional equipment (not shown). The other end wall can be attached similarly or it can be a removable cover. The resulting container can be equipped with any desired access openings, which I have not shown, since they are not involved in the present invention.

From the foregoing description, it is seen my invention affords a lined container of simple construction which fully overcomes previous difficulties encountered with containers of this type. The critical step in making my container is in uniformly expanding the composite shell sufficiently that the outer shell, as well as the inner, measurably expands. This action is essential to eliminate voids and crevices between the shells. I intend the term "container" to be construed broadly, including for example, a pipe, as well as a drum or pail.

While I have shown and described only a single embodiment of my invention, it is apparent that modifications may arise. Therefore, I do not wish to be limited to the disclosure set forth but only by the scope of the appended claims.

I claim:

1. A container comprising a cylindrical wall and an end wall, said cylindrical wall being a composite shell which includes preformed open-ended cylindrical outer and inner shells of dissimilar metals, said outer and inner shells each having its own independently welded longitudinal seam, said inner shell being inserted in said outer shell and closely received therein, both said inner and outer shells being expanded uniformly after insertion of the inner shell to form said composite shell as an open-ended tight unitized cylinder free of voids and crevices, the outside diameter of said composite shell after expansion being at least ¼ inch greater than the original outside diameter of said outer shell, said composite shell having outwardly bent end edges and intermediate beads around its circumference formed after the shells are expanded, said end wall being fixed to one of said bent end edges and being of laminated stock, the layers of which are similar in composition to said inner and outer shells respectively.

2. A method of making a container comprising preforming inner and outer shells of dissimilar metals and independently welding longitudinal seams in each to form two separate open-ended cylinders of diameters such that said inner shell can fit closely within said outer shell, inserting said inner shell in said outer shell, placing the shells over a mandrel in an assembly line operation, expanding both shells uniformly and simultaneously with said mandrel to form a composite shell which is an open-ended tight unitized cylinder free of voids and crevices and has an outside diameter at least ¼ inch greater than the original outside diameter of said outer shell, forming bent end edges and intermediate beads around the circumference of the expanded composite shell, and fixing an end wall of laminated stock to one of said bent end edges.

References Cited by the Examiner
UNITED STATES PATENTS

| | | | |
|---|---|---|---|
| 2,132,565 | 10/1938 | Graham | 29—523 |
| 2,263,714 | 11/1941 | Bloomfield et al. | 29—523 |
| 2,794,570 | 6/1957 | Downs | 220—63 |
| 2,861,714 | 11/1958 | Glossop | 220—63 |
| 3,019,753 | 2/1962 | Orlins | 220—63 |
| 3,064,344 | 11/1962 | Arne | 220—63 |

THERON E. CONDON, *Primary Examiner.*

EARLE J. DRUMMOND, GEORGE O. RALSTON, *Examiners.*